R. Carpenter,
Raisin Seeder,
N° 41,757. Patented Mar. 1, 1864.
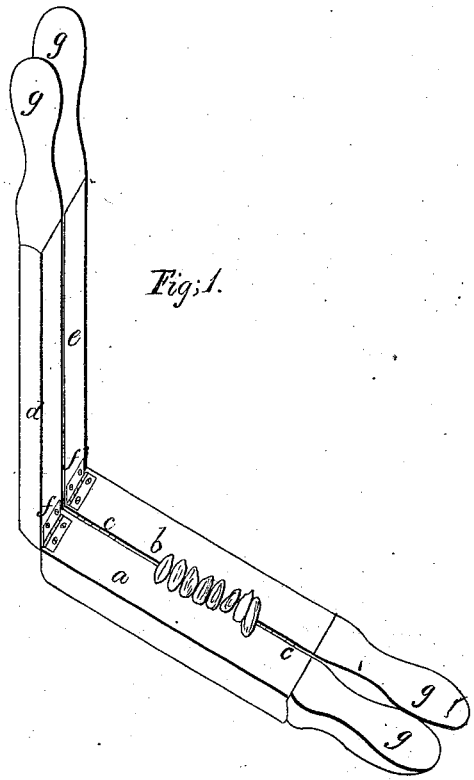
Fig: 1.
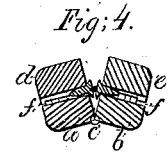
Fig: 4.
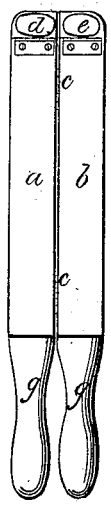
Fig: 2.
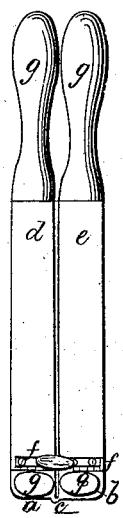
Fig: 3.
Witnesses.
J. Gould.
S. M. McIntire.
Inventor.
R. Carpenter
By Atty
J. B. Cushy

UNITED STATES PATENT OFFICE.

ROSANNA CARPENTER, OF PORTSMOUTH, NEW HAMPSHIRE.

IMPROVED RAISIN-STONER.

Specification forming part of Letters Patent No. 41,757, dated March 1, 1864.

*To all whom it may concern:*

Be it known that I, ROSANNA CARPENTER, of Portsmouth, in the county of Rockingham and State of New Hampshire, have invented a new and useful Machine or Apparatus for Stoning Raisins; and I do hereby declare that the following, taken in connection with the drawings which accompany and form part of this specification, is a description of my invention sufficient to enable those skilled in the art to practice it.

This invention relates to the arrangement and manner of operation of an apparatus consisting of a series of hinged levers for the separation of the stones or seeds of raisins from the pulp, as I will proceed to describe.

Figure 1 represents a perspective view of the apparatus opened for the introduction of the raisins; Fig. 2, a top view, and Fig. 3 a front view, of the same. Fig. 4 shows a cross-section of the levers when closed or nearly closed together.

$a\ b$ denote two base-levers, similar in form and hinged together at their lower contiguous corners, as seen at $c$. At its rear end each of these is hinged to one of two other and similar levers, $d\ e$, as seen at $f$, so that the set $d\ e$ can be turned up from the set $a\ b$, while the latter (carrying with them the former) can be turned on the hinges $c$, as illustrated in Fig. 4.

Each lever is provided with a handle, $g$, by which it is operated.

To use the machine the raisins are placed lengthwise across the top surface of the levers $a\ b$, resting partially on both surfaces, as seen in Fig. 1. The levers $d\ e$ are then brought down upon them, so as to inclose the raisins between the four adjacent surfaces. The four handles are now grasped in one hand, so as to hold the raisins when a thin knife-blade is passed through the raisins, between the side surfaces of the levers, or so as to cut transversely through the raisins. When this is done, the levers on opposite sides being separated, or the top and bottom lever on one side being turned from the top and bottom lever on the other side, and then the side levers pressed together, the raisin stones will be squeezed or pressed out from the pulp and skins into the space between the opposite levers, from which they can readily be removed by a fork or other convenient instrument. The levers being then opened, the pulp and skins cleaned from the stones can be scraped from their surfaces.

The operation of stoning raisins by hand is tedious and troublesome. The stones are generally cut out from the raisins separately by a knife, and their glutinous nature causes them to adhere with great tenacity to the fingers and knife. With my machine, however, after a little practice, the whole raisins can be arranged along the surface of the lower levers, the upper levers brought down upon them, the raisins cut, and the stones squeezed therefrom and taken from the machine with expedition, and without any contact of the fingers with the raisin-pulp, making a much more cleanly and agreeable process than that of removing the stones by the fingers alone or with the aid of a knife.

The plain surfaces of the levers or squeezers admit of easy washing and drying, so that the machine need not become or remain clogged with the glutinous raisin-pulp.

What I claim is—

The arrangement of series or sets of levers to operate together in the manner and for the purpose substantially as set forth.

ROSANNA CARPENTER.

Witnesses:
JAMES W. TREADWELL,
WILLIAM H. HACKETT.